United States Patent
Homma (10) Patent No.: US 9,912,195 B2
(45) Date of Patent: Mar. 6, 2018

(54) WIRELESS POWER SUPPLY SYSTEM, POWER TRANSMISSION DEVICE AND POWER RECEIVING DEVICE

(71) Applicant: Mitsubishi Electric Corporation, Chiyoda-ku (JP)

(72) Inventor: Yukihiro Homma, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 495 days.

(21) Appl. No.: 14/410,845

(22) PCT Filed: Jun. 18, 2013

(86) PCT No.: PCT/JP2013/066737
§ 371 (c)(1),
(2) Date: Dec. 23, 2014

(87) PCT Pub. No.: WO2014/007057
PCT Pub. Date: Jan. 9, 2014

(65) Prior Publication Data
US 2015/0194845 A1    Jul. 9, 2015

(30) Foreign Application Priority Data
Jul. 3, 2012    (JP) ................. 2012-149334

(51) Int. Cl.
*H02J 50/90*    (2016.01)
*H02J 17/00*    (2006.01)
(Continued)

(52) U.S. Cl.
CPC .............. *H02J 17/00* (2013.01); *H02J 5/005* (2013.01); *H02J 50/12* (2016.02); *H02J 50/80* (2016.02);
(Continued)

(58) Field of Classification Search
CPC ....................................................... H02J 17/00
See application file for complete search history.

(56) References Cited

U.S. PATENT DOCUMENTS

| | | | |
|---|---|---|---|
| 5,307,080 A | 4/1994 | Okumura | |
| 6,967,462 B1 * | 11/2005 | Landis | H02J 17/00 320/101 |

(Continued)

FOREIGN PATENT DOCUMENTS

| | | |
|---|---|---|
| CN | 102163862 A | 8/2011 |
| JP | 5 129830 | 5/1993 |

(Continued)

OTHER PUBLICATIONS

International Search Report dated Sep. 3, 2013 in PCT/JP13/066737 Filed Jun. 18, 2013.

(Continued)

Primary Examiner — Rexford Barnie
Assistant Examiner — David Shiao
(74) Attorney, Agent, or Firm — Oblon, McClelland, Maier & Neustadt, L.L.P.

(57) ABSTRACT

A wireless power supply system is a system wirelessly supplying electric power through electromagnetic waves. The wireless power supply system includes a power transmitter transmitting an electromagnetic wave, and a plurality of power receivers disposed on a rotatable object that rotates around a rotation axis and receives the electromagnetic wave. Further, the plurality of power receivers of the wireless power supply system is disposed such that at least one of the plurality of power receivers is located within a coverage area formed by the electromagnetic wave transmitted by the power transmitter.

6 Claims, 9 Drawing Sheets

(51) Int. Cl.
*H02J 5/00* (2016.01)
*H02J 50/12* (2016.01)
*H02J 50/80* (2016.01)
H02J 50/30 (2016.01)
H02J 50/23 (2016.01)
H02J 7/02 (2016.01)

(52) U.S. Cl.
CPC ............. *H02J 50/90* (2016.02); *H02J 7/025* (2013.01); *H02J 50/23* (2016.02); *H02J 50/30* (2016.02)

(56) References Cited

U.S. PATENT DOCUMENTS

| | | | |
|---|---|---|---|
| 2003/0192586 A1 | 10/2003 | Takada et al. | |
| 2005/0096800 A1* | 5/2005 | Tanielian | B64C 39/024 701/2 |
| 2005/0190427 A1* | 9/2005 | Steinsiek | B64G 1/428 359/237 |
| 2007/0274226 A1* | 11/2007 | Tillotson | H02J 17/00 370/252 |
| 2008/0245930 A1* | 10/2008 | Nayfeh | B64D 27/24 244/53 R |
| 2010/0033021 A1* | 2/2010 | Bennett | H02J 17/00 307/104 |
| 2010/0044123 A1* | 2/2010 | Perlman | B60L 11/1816 180/2.1 |
| 2010/0259447 A1* | 10/2010 | Crouch | H01Q 3/2647 342/374 |
| 2011/0199028 A1 | 8/2011 | Yamazaki et al. | |
| 2013/0069625 A1* | 3/2013 | Gilchrist | G01R 31/40 324/76.11 |

FOREIGN PATENT DOCUMENTS

| | | |
|---|---|---|
| JP | 2003 309938 | 10/2003 |
| JP | 2008 204061 | 9/2008 |
| JP | 2009 178001 | 8/2009 |
| JP | 2011 101485 | 5/2011 |
| JP | 2011 188733 | 9/2011 |

OTHER PUBLICATIONS

Extended European Search Report dated Jan. 27, 2016 in Patent Application 13813665.0.
Office Action dated Nov. 10, 2015 in Japanese Patent Application No. 2012-149334 with English translation.
Combined Chinese Office Action and Search Report dated Jun. 8, 2016, in Patent Application No. 201380031964.6 (with Partial English translation and English translation of categories of cited documents).

* cited by examiner

FIG. 1A

FIG. 1B (AXISYMMETRICAL PORTION UNILLUSTRATED)

VIEW TAKEN ALONG LINE A-A

WIRELESS POWER SUPPLY SYSTEM, POWER TRANSMISSION DEVICE AND POWER RECEIVING DEVICE

TECHNICAL FIELD

The present disclosure relates to a system that wirelessly supplies electric power stably using a radio wave scheme that transmits/receives electric power through electromagnetic waves. More specifically, the present disclosure relates to a wireless power supply system including a power transmitter that transmits an electromagnetic wave stably to moving power receivers disposed on a rotatable object or a movable object.

BACKGROUND ART

In devices (for example, a large-scale telescope for astronomical observation, a large-scale parabolic antenna for satellite communication, a large-scale overhead travelling crane, or automatic processing machine) having a large-scale structure that includes a power consumer that consumes electric power (for example, a driver or a sensor), the devices being driven largely around a rotation axis by a driver, conventionally, in order to minimize an occurrence of noise and to improve the easiness of maintenance, thick power cables are laid across a long distance. In addition, in the case of a device requiring drive precision, a cable winding device with a complex mechanism is additionally provided so as not to apply the tension of the cable to a driving device.

In contrast, Patent Literature 1 discloses, as an example of supplying electric power through a wireless power supply that employs a radio wave scheme, an antenna mirror surface adjusting device in which an electromagnetic wave is externally transmitted to an actuator that adjusts the mirror surface shape of an antenna reflector loaded in a space flying object such as an artificial satellite. According to this technology, a transmitter that transmits an electromagnetic wave, a power converter that converts the electromagnetic wave into electric power, actuators that adjust the mirror surface shape, and a controller that controls the actuators are provided, and the mirror surface shape of the antenna reflector is adjusted using wirelessly transmitted electric power with electromagnetic waves as source electric power.

In addition, Patent Literature 2 discloses an energy transmission system that wirelessly transmits energy to an electrical power receiver of a vehicle from an electrical power transmitter provided in a roadside device. According to this technology, the roadside device including a transmission device that transmits transmission condition information determining a transmitting direction of an electromagnetic wave to a vehicle is provided, and the vehicle is provided with a signal transmitter that receives the transmitted transmission condition information and transmits, to a signal receiver of the roadside device, correction information to correct the transmitting direction of the electromagnetic wave based on the transmission condition information. Hence, the precision of the transmitting direction of the electromagnetic wave is improved.

CITATION LIST

Patent Literature

Patent Literature 1: Unexamined Japanese Patent Application Kokai Publication No. H05-129830

Patent Literature 2: Unexamined Japanese Patent Application Kokai Publication No. 2009-178001

SUMMARY OF INVENTION

Technical Problem

According to the conventional antenna mirror surface adjusting device disclosed in Patent Literature 1, the transmitter transmits an electromagnetic wave, the power converter receives the electromagnetic wave and converts the electromagnetic wave into electric power, and a power consuming device such as an actuator is driven. However, when the positions of the transmitter and the power converter are displaced greatly relative to each other, the device fails to transmit the electromagnetic wave always oriented to the power converter by following the displacement, thereby causing a problem of an unstable power supply.

In addition, according to the energy transmission system disclosed in Patent Literature 2, it is suggested that electric power can be supplied to a moving vehicle by emitting an electromagnetic wave from a power supply device. However, as in Patent Literature 2, when there is only one set of the power supply device and a power receiving device for the moving vehicle, the power supply is enabled only within an area where the power receiving device is in a line-of-sight coverage of the power supply device. Accordingly, the power supply is enabled only within a limited drive range.

Still further, in the case of, for example, a large-scale telescope or a parabolic antenna, the drive range of an elevation (hereinafter, referred to as "EL" as an abbreviated explanation of "ELevation") axis is between 0 and 90 degrees, and the large-scale telescope or the parabolic antenna is driven within a substantially line-of-sight coverage of only one fixed power transmitter. However, the drive range of an azimuth (hereinafter, referred to as "AZ" as an abbreviated explanation of "AZimuth") axis may cover a wide range between −270 degrees and +270 degrees. Hence, moving power receivers disposed on a rotatable object (AZ rotational structure) is no longer within the line-of-sight coverage of the one fixed power transmitter, and thus out of the coverage area of the transmitted electromagnetic wave. Therefore, power supply through the energy transmission system using an electromagnetic wave becomes difficult.

It is an objective of the present disclosure to eliminate the need for an additional installation of a cable winding device with a complex mechanism even when a rotatable object like an antenna including a power consumer like a driver that consumes electric power is driven and controlled in a wide drive range, or even when a movable object moves on a linear trajectory. In addition, it is another objective of the present disclosure to address a problem that, when a power receiver is disposed on the rotatable object or the movable object and then the power receiver moves, a power transmitter becomes unable to transmit an electromagnetic wave to the power receiver and the power supply becomes unstable, and to realize a stable power supply with a simple structure.

Solution to Problem

A wireless power supply system is a wireless power supply system that wirelessly supplies electric power through electromagnetic waves. The wireless power supply system includes a power transmitter that transmits an electromagnetic wave, and power receivers that are disposed on a rotatable object rotatable around a rotation axis and that receive the electromagnetic wave, the power receivers being disposed in such a way that at least one of the power receivers is located within a coverage area formed by the electromagnetic wave transmitted by the power transmitter, and a driver controller that calculates transmitting direction information for determining transmitting direction of the electromagnetic wave for the power receiver located within the coverage area, from driver control data to drive and control rotation of the rotatable object. The power transmitter includes a transmitting direction information obtainer that obtains the transmitting direction information and a direction controllable transmitter that transmits the electromagnetic wave in a direction calculated based on the transmitting direction information.

Advantageous Effects of Invention

According to the present disclosure, a heavy and thick power cable is not utilized and an additional complex power-cable winding device is not necessary, thereby resulting in weight savings, space savings, and an improvement of the easiness of maintenance. In addition, the driving is performed without a disturbance occurring due to the heavy tension of a power cable, and thus a drive precision is improved. Still further, power receivers are disposed on the rotatable object or the movable object for one power transmitter, and the electromagnetic wave is transmitted to the power receivers driven and moved in a wide drive range. Hence, an advantageous effect of realizing a stable wireless power supply without interrupting the operation of a satellite communication antenna, a telescope, an overhead travelling crane, and the like is accomplished.

DESCRIPTION OF EMBODIMENTS

First Embodiment

Figure 1A:
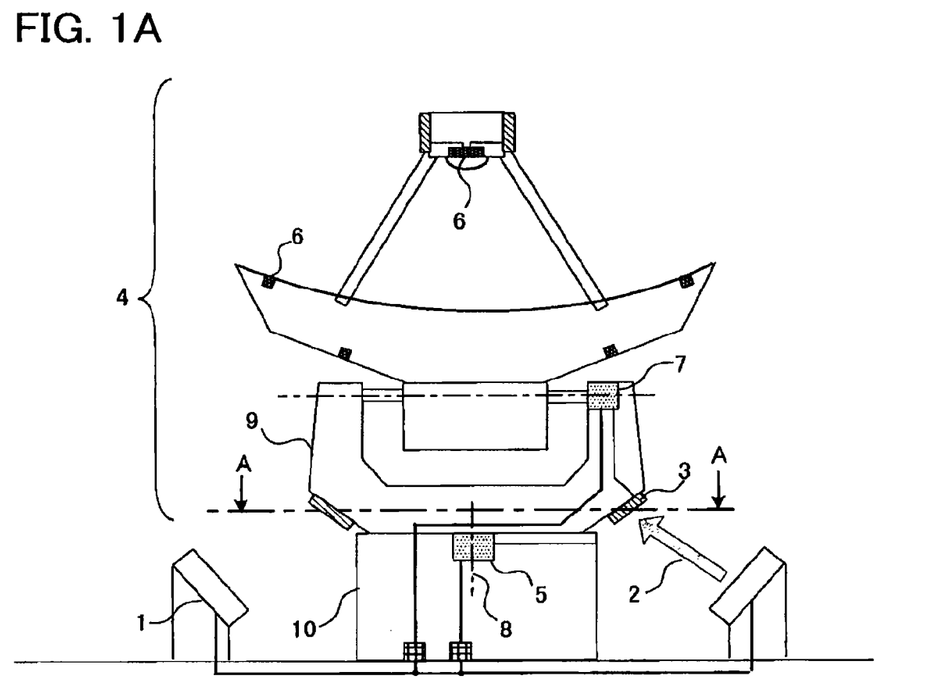
FIG. 1A is a structure explanatory diagram of a wireless power supply system according to a first embodiment.
Figure 1B:
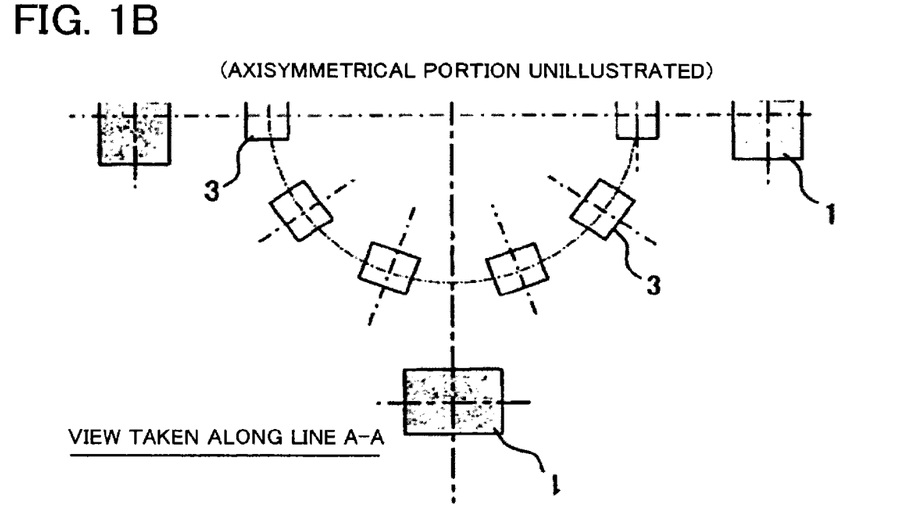
FIG. 1B is a structure explanatory diagram of the wireless power supply system according to the first embodiment.

FIGS. 1A and 1B are structure explanatory diagrams of a wireless power supply system according to this embodiment. FIG. 1A is a structure diagram as viewed from the front. FIG. 1B is a diagram taken along a line A-A in FIG. 1A, and axisymmetric portions are not illustrated. In FIGS. 1A and 1B, reference numeral 1 denotes a power transmitter, reference numeral 2 denotes an electromagnetic wave transmitted by the power transmitter 1, and reference numeral 3 denotes a power receiver receiving the electromagnetic wave 2. In FIGS. 1A and 1B, reference numeral 4 denotes an AZ rotational structure that is a rotatable object that rotates and the power receivers 3 are disposed on the structure. In FIGS. 1A and 1B, reference numeral 5 denotes an AZ driver that drives the AZ rotational structure 4, reference numeral 6 denotes a power consumer of the AZ rotational structure 4, the power consumer consuming electric power, reference numeral 7 denotes an EL driver included in the power consumer 6, reference numeral 8 denotes an AZ axis that is a rotation center of the AZ rotational structure 4, reference numeral 9 denotes an EL mount of the AZ rotational structure 4 on which the power receivers 3 are disposed, and reference numeral 10 denotes a mount stage supporting the AZ rotational structure 4 in a manner such that AZ rotational structure 4 rotates freely.

Next, a structure of this embodiment and a disposition thereof is explained in more detail. As illustrated in FIG. 1A, the power transmitters 1 are disposed at plural locations (four locations in the figures including unillustrated locations) around the AZ rotational structure 4 where the power receivers 3 are in line-of-sight coverage of the power transmitters 1, and transmit the electromagnetic waves 2 indicated by the arrow in the figure to the power receivers 3.

The power receivers 3 are disposed at plural locations on the outer circumference of the EL mount 9 of the AZ rotational structure 4 as illustrated in FIG. 1B taken along the line A-A. The power receivers 3 revolve and move in accordance with a rotation of the AZ rotational structure 4 driven by the AZ driver 5. The power receivers 3 are disposed, for example, at plural locations on the same circumference of a circle (10 locations in the figures including unillustrated locations) in such a way that at least one of the power receivers 3 receives an electromagnetic wave 2 when passing through and being located within the coverage areas of the electromagnetic waves 2 transmitted by the respective four power transmitters 1. The power receivers 3 are connected with the power consumer 6 that is included in the AZ rotational structure 4 and consumes electric power, convert the received electromagnetic waves 2 into electric power, and supply the electric power to the power consumer 6. Since the AZ driver 5 is fixed on the mount stage 10, electric power is supplied thereto through a power cable.

The power consumer 6 is a part that consumes electric power for the EL driver 7, a sensor, and the like. Examples of sensors are a temperature sensor, a rotation angle sensor, an accelerometer, and the like. Such sensors are attached to, for example, the AZ rotational structure 4. In addition, the power consumer 6 also includes a fan attached to a reflector of the AZ rotational structure 4 to maintain a constant internal temperature by stirring air in the reflector for suppressing a deformation, an actuator that controls the mirror surface shape to maintain the mirror surface precision of the reflector, or the like.

Figure 2:
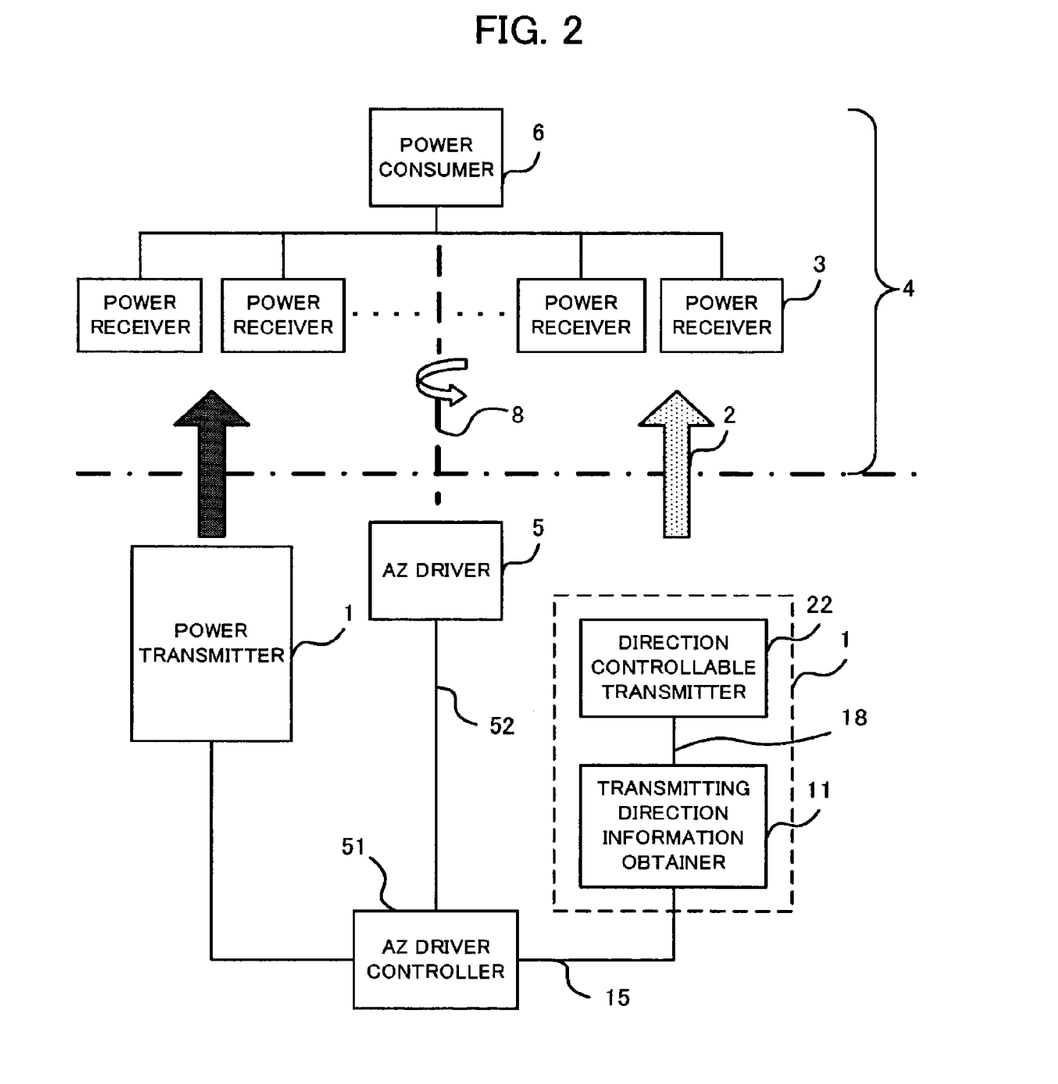
FIG. 2 is a block diagram of the wireless power supply system according to the first embodiment.

FIG. 2 is a block diagram of the wireless power supply system of this embodiment. In FIG. 2, reference numeral 11 denotes a transmitting direction information obtainer provided in the power transmitter 1 and obtaining information regarding the transmitting direction, reference numeral 15 denotes transmitting direction information that is information regarding the transmitting direction of the electromagnetic wave 2 transmitted by the power transmitter 1, reference numeral 18 denotes a transmitting direction instruction calculated by the transmitting direction information obtainer 11 from the transmitting direction information 15, reference numeral 22 denotes a direction controllable transmitter provided in the power transmitter 1 and performing a transmission in accordance with the transmitting direction instruction 18, reference numeral 51 denotes an AZ driver controller that drives and controls the AZ driver 5, and reference numeral 52 denotes AZ driver control data to instruct the driving and controlling of the AZ driver 5.

Next, an operation of the wireless power supply system is explained with reference to FIG. 2. The AZ driver controller 51 outputs, to the AZ driver 5, the AZ driver control data 52 to drive and control the AZ driver 5. The AZ driver 5 tracks a satellite or the like while rotating around the AZ axis 8 (rotates in both clockwise and counterclockwise directions) in accordance with this AZ driver control data 52. In this case, the AZ driver control data 52 is instruction data to obtain rotation angle information at a previous step time and calculate a rotation angle, an angular speed, an angular acceleration and the like at the subsequent step time for driving and controlling.

In addition, the AZ driver controller 51 predicts, based on the AZ driver control data 52, the positions of the power receivers 3 moving in accordance with the rotation of the rotatable object (AZ rotational structure 4) and calculates and outputs the transmitting direction information 15 that is information regarding the direction in which each power transmitter 1 transmits the electromagnetic wave 2. In each power transmitter 1, the transmitting direction information obtainer 11 obtains the transmitting direction information 15 from the AZ driver controller 51. Next, the direction controllable transmitter 22 transmits, in accordance with the transmitting direction instruction 18 calculated from the transmitting direction information 15, the electromagnetic wave 2 to at least one of the moving power receivers 3.

Among the power receivers 3 disposed on the outer circumference of the EL mount 9 of the AZ rotational structure 4, the power receiver 3 within the coverage area formed by the electromagnetic wave transmitted from the power transmitter 1 receives the electromagnetic wave 2 while moving, and converts the received electromagnetic wave 2 into electric power. The power consumer 6 receives electric power from the power receivers 3 and operates. In addition, in the case of, for example, tracking a specific geostationary satellite, the AZ rotational structure 4 (rotatable object) is substantially static while maintaining the certain angle, and thus the power supply is easy.

Next, a transmitting direction control is explained in detail. The power transmitter 1 of this embodiment has a narrowed coverage area of the transmitted electromagnetic wave 2 like a pencil shape, and precisely emits (transmits) the electromagnetic wave 2 toward the power receiver 3, thereby improving the efficiency of power supply. The direction in which the electromagnetic wave 2 is transmitted is calculated from the transmitting direction information 15. Here, the transmitting direction information 15 is information that is used by the power transmitter 1 to determine the direction in which the power transmitter 1 transmits the electromagnetic wave 2, and includes information, such as positions where the turning and moving power receivers 3 reach in the next step time, the transmitting direction to the power receiver 3 from each power transmitter 1, and frequency. This transmitting direction information 15 is calculated from the rotation angle information at the previous step time. For example, the transmitting direction information 15 is calculated from the coordinate value of each power receiver 3 in the coordinate system fixed to the rotatable object, the angular speed, the angular acceleration, and the like.

Each power transmitter 1 includes the transmitting direction information obtainer 11 and the direction controllable transmitter 22. Each transmitting direction information obtainer 11 calculates the transmitting direction instruction 18 based on the transmitting direction information 15 obtained from the AZ driver controller 51. The transmitting direction instruction 18 is information for causing the direction controllable transmitter 22 to electronically or mechanically transmit the electromagnetic wave 2.

The direction controllable transmitter 22 includes a phased array antenna when the direction controllable transmitter 22 changes the emitting direction of a beam electronically. Next, the direction controllable transmitter 22 emits, to the power receiver 3, an electron beam in a pencil-like shape with a narrow coverage area at a fast speed in accordance with the transmitting direction instruction 18. When the emitting direction of the beam is mechanically changed, the direction controllable transmitter 22 includes an antenna that is mechanically driven and emits the electromagnetic wave 2. Next, the direction controllable transmitter 22 mechanically drives the antenna and emits (transmits) the electromagnetic wave 2 in the direction indicated by the transmitting direction instruction 18 calculated based on the transmitting direction information 15 output by the transmitting direction information obtainer 11.

As explained above, according to this embodiment, a heavy and thick power cable is not utilized and an additional complex power-cable winding device is not necessary, thereby resulting in weight savings, space savings, and an improvement of the easiness of maintenance. In addition, the driving is performed without a disturbance occurring due to the heavy tension of a power cable, and thus the drive precision is improved. Still further, the power receivers 3 are disposed on the AZ rotational structure 4 (rotatable object) for one power transmitter 1, and the electromagnetic wave 2 is transmitted to the power receivers 3 moving in a wide drive range. Hence, a stable wireless power supply is realized without interrupting the operation of a satellite communication antenna or a telescope. Still further, information regarding the transmitting direction of the transmission by the power transmitter 1 is obtained using the AZ driver control data 52, and the beam is emitted to at least one of the power receivers 3 reaching the transmitting direction among the turning and moving power receivers 3 included in the AZ rotational structure 4. Therefore, excellent power supply efficiency is accomplished.

When, between the power receiver 3 and the power consumer 6, a DC-DC converter converting a direct current voltage into another direct current voltage, a capacitor, a compact battery that stores electric power converted from the electromagnetic wave 2 received by the power receiver 3, and the like are installed, the electric power supplied to the power consumer 6 is made further stable even with a temporal failure of the receiving.

Still further, a further large battery may be installed on the AZ rotational structure 4, and the large battery is charged only when the AZ rotational structure 4 is driven within a preset AZ angle range. In this case, the number of power transmitters 1, the power receivers 3, and the like is reduced.

Second Embodiment

Figure 3:
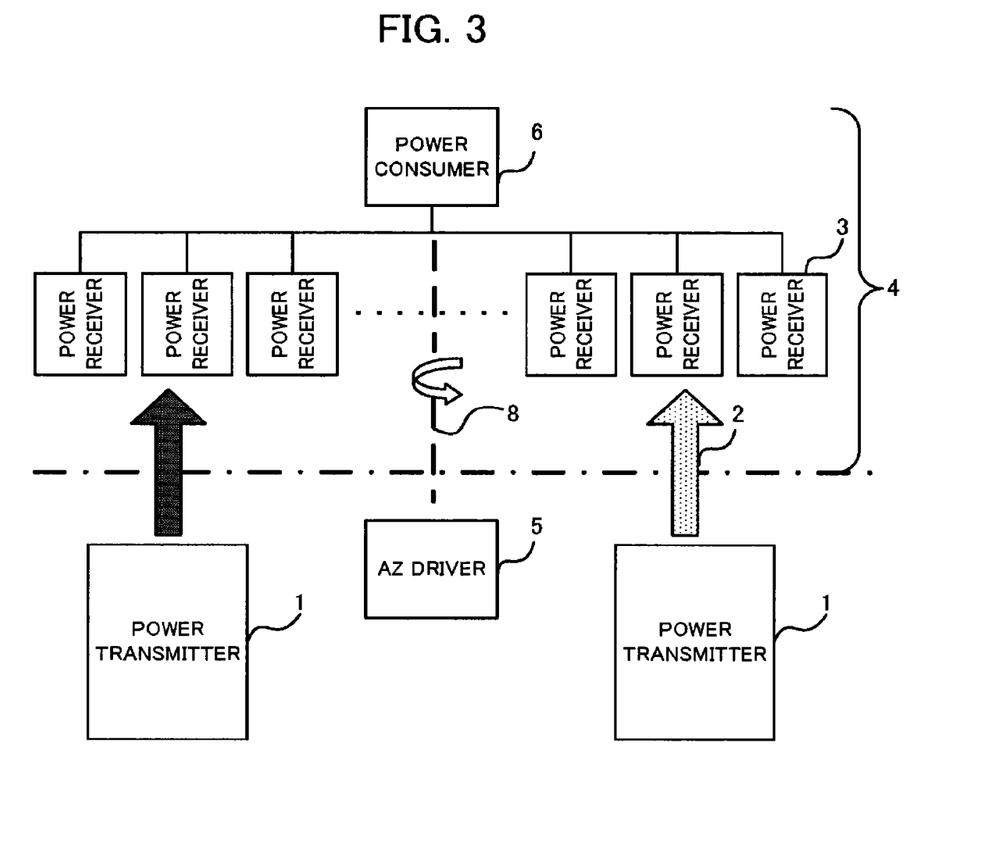
FIG. 3 is a block diagram of a wireless power supply system according to a second embodiment.

FIG. 3 is a block diagram of a wireless power supply system according to this embodiment. An explanation is given below of a configuration of the wireless power supply system according to a second embodiment and an operation thereof with reference to FIG. 3. The configuration is substantially same as in FIGS. 1A and 1B. In this embodiment, the coverage area formed by the electromagnetic wave 2 transmitted by a power transmitter 1 is formed in a wide fan-like shape so as to cover one or two or more power receivers 3, and the transmitting direction of the transmission is not controlled. As illustrated in FIG. 3, the number of the power receivers 3 that are disposed on the outer circumference of an EL mount 9 of an AZ rotational structure 4 is greater than that of the first embodiment. The power receivers 3 are turned and moved while the AZ rotational structure 4 is driven around an AZ axis 8 by an AZ driver 5, and when at least one of the power receivers 3 passes through and is located within the coverage area of the electromagnetic wave 2 transmitted by each of the four power transmitters 1, the power receiver 3 receives the electromagnetic wave 2. Hence, the electric power is supplied to the power consumer 6 from four or more power receivers 3 receiving the electromagnetic waves 2 from the four power transmitters 1.

As explained above, according to the second embodiment, as with the first embodiment, a heavy and thick power cable is not utilized, thereby resulting in weight savings, space savings and the improvement of the easiness of maintenance. In addition, the driving is performed without a disturbance occurring due to the heavy tension of a power cable, and thus the drive precision is improved.

In addition, the electromagnetic wave 2 may not be transmitted (emitted) in the direction of the power receiver 3 and thus the power supply efficiency may be decreased, but control of the direction of the beam (the electromagnetic wave) transmitted by the power transmitter 1 is not required. Furthermore, even with a wide drive range, the increased number of power receivers 3 enables stable power supply to the larger number of the power receivers 3 disposed on the outer circumference of the AZ rotational structure 4 (rotatable object). As a result, the number of power receivers 3 having a simple structure increases, but this offers an advantage of a relatively simple structure of the power transmitter 1.

Third Embodiment

Figure 4:
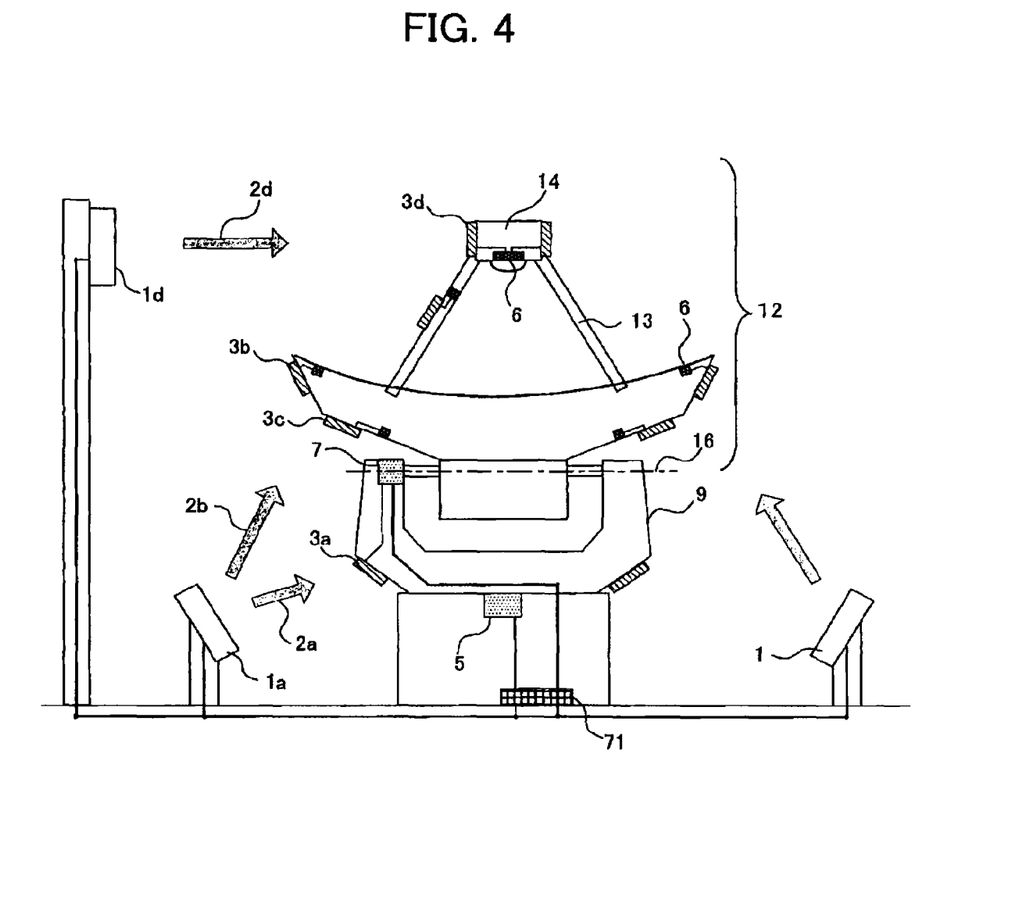
FIG. 4 is a structure explanatory diagram of a wireless power supply system according to a third embodiment.

FIG. 4 is a structure explanatory diagram of a wireless power supply system according to this embodiment. In FIG. 4, reference numeral 12 denotes an EL rotational structure that is a rotatable object that rotates and is included in the AZ rotational structure 4 and the power receivers 3 are disposed on the EL rotational structure, reference numeral 13 denotes a secondary mirror support of the AZ rotational structure 4 and the secondary mirror support is included in the EL rotational structure 12. In FIG. 4, reference numeral 14 denotes a secondary mirror that is supported by the secondary mirror support 13 and the power receivers 3 are disposed on the secondary mirror, and reference numeral 16 denotes an EL axis that is a rotation center of the EL rotational structure 12.

Power receivers 3a illustrated in FIG. 4 are disposed on plural locations (10 locations in FIG. 1B) on the outer circumference of an EL mount 9 substantially as with the first embodiment, and supply electric power to an EL driver 7 and the like. Power receivers 3b, 3c are disposed on the outer circumference of the EL rotational structure 12, and supply electric power to a power consumer 6 of the EL rotational structure 12. Power transmitters 1 are disposed on plural locations (four locations in FIG. 1B) around the antenna substantially as with the second embodiment. A power transmitter 1d is disposed on a location where the secondary mirror 14 is within a line of sight thereof to supply electric power to power receivers 3d of the secondary mirror 14. In the case of a large-scale telescope, the power transmitter 1d is disposed on a dome provided so as to cover the telescope.

Figure 5:
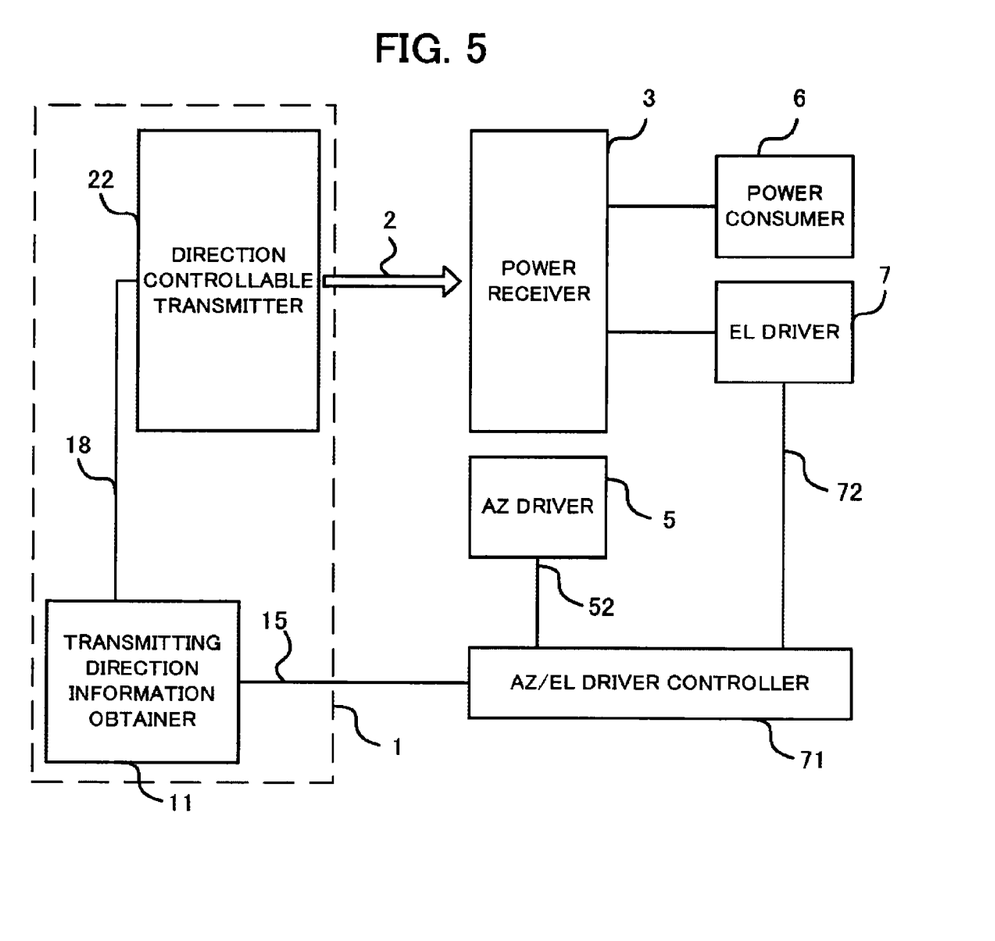
FIG. 5 is a block diagram of the wireless power supply system according to the third embodiment.

FIG. 5 is a block diagram of the wireless power supply system according to this embodiment. An AZ/EL driver controller 71 in FIG. 5 outputs the AZ driver control data 52 to control the driving of the AZ driver 5, and also outputs EL driver control data 72 to control the driving of the EL driver 7. In addition, the AZ/EL driver controller 71 outputs the transmitting direction information 15 to the respective transmitting direction information obtainers 11 of the power transmitters 1 based on those AZ driver control data 52 and EL driver control data 72 so as to enable the emission of the electromagnetic wave 2 to not only the power receivers 3a disposed on the outer circumference of the EL mount 9 but also the power receivers 3b, 3c disposed on the outer circumference of the EL rotational structure 12 rotating around the EL axis 16.

In FIG. 4, the power transmitter 1a obtains the transmitting direction information 15, and calculates the transmitting direction. Next, based on the calculated transmitting direction, the power transmitter 1a emits the electromagnetic wave beam to the power receiver 3 in a time-division manner while tracking not only the rotation of the AZ axis but also the rotation of the EL axis 16. At this time, the power transmitter 1a substantially simultaneously emits an electromagnetic wave 2a to the power receiver 3a on the EL mount 9 and an electromagnetic wave 2b to the power receivers 3b, 3c on the EL rotational structure 12. The power transmitter 1d installed at the location where the secondary mirror 14 is in a line of sight thereof emits an electromagnetic wave 2d to the power receivers 3d disposed on the outer circumference of the secondary mirror 14, and supplies electric power to a secondary mirror driver that drives the secondary mirror 14, and the like.

As explained above, each power transmitter 1 obtains the transmitting direction information 15 calculated based on the driver control data by the AZ/EL driver controller 71, and calculates the transmitting direction of the electromagnetic wave 2 based on the obtained transmitting direction information 15. Next, the power transmitter 1 emits, in a time-division manner, the electromagnetic wave 2 to the power receiver 3 on the EL mount 9 and the specific power receiver 3 among the power receivers 3 disposed on the EL rotational structure 12 based on the calculated transmitting direction. Hence, the wireless power supply system has less emission failure, and can supply electric power stably to the EL driver 7, the power consumer 6, and the like, which are included in the AZ rotational structure 4.

Fourth Embodiment

Figure 6:
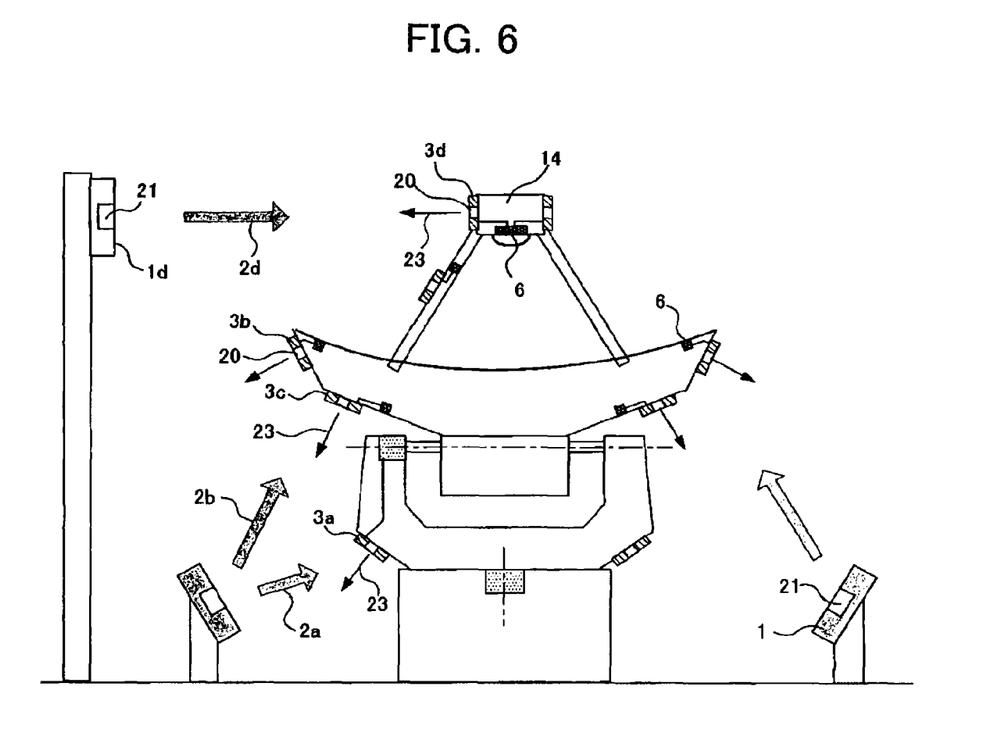
FIG. 6 is a structure explanatory diagram of a wireless power supply system according to a fourth embodiment.

FIG. 6 is a structure explanatory diagram of a wireless power supply system of this embodiment. The whole structure of the antenna, and the arrangement of the power receivers 3 and the power transmitters 1 are the same as those of the second embodiment. A pilot signal transmitter 20 that transmits a pilot signal 23 is installed near the center of each of the power receivers 3. The power transmitter 1 includes, in addition to the transmitting direction information obtainer 11 and the direction controllable transmitter 22, a pilot signal receiver 21.

Figure 7:
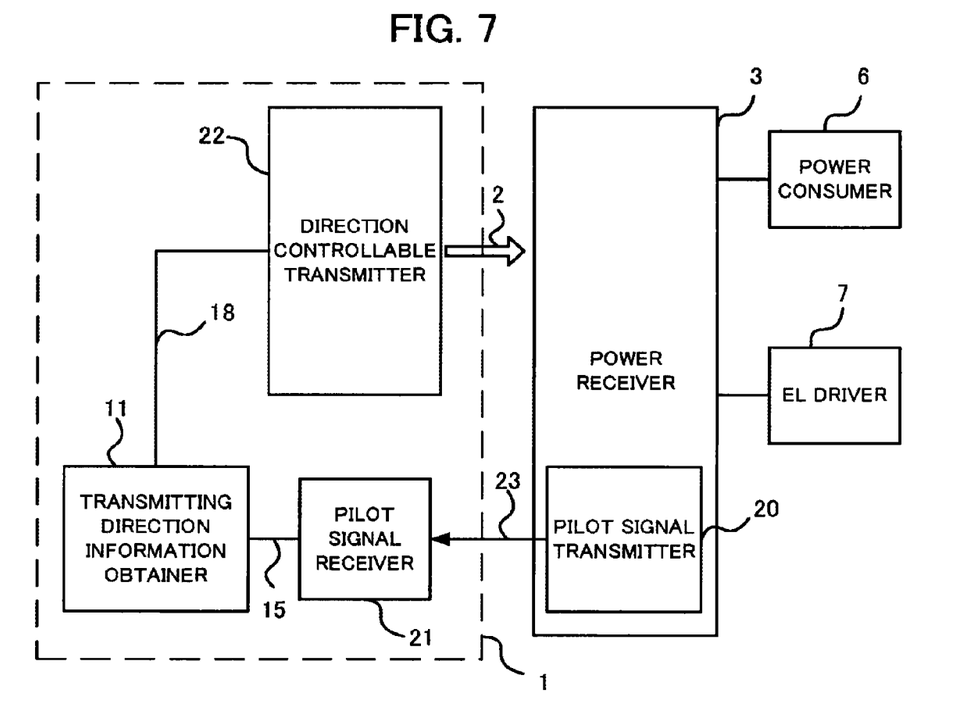
FIG. 7 is a block diagram of the wireless power supply system according to the fourth embodiment.

FIG. 7 is a block diagram of the wireless power supply system according to this embodiment. The pilot signal transmitter 20 of each of the power receivers 3 transmits the pilot signal 23. The power receivers 3 each receive electric power when turning and moving and then reaching a position located within the coverage area of the electromagnetic wave 2. The power transmitter 1 detects a direction in which the pilot signal 23 comes based on the pilot signal 23 received by the pilot signal receiver 21, and obtains the transmitting direction information 15. The transmitting direction information obtainer 11 outputs the transmitting direction instruction 18 to the direction controllable transmitter 22 so as to cause the direction controllable transmitter 22 to emit the electromagnetic wave 2 in the transmitting direction calculated based on the transmitting direction information 15. The direction controllable transmitter 22 mechanically or electronically changes the transmitting direction in accordance with this transmitting direction instruction 18, and emits the electromagnetic wave 2.

For example, the power transmitter 1d in FIG. 6 receives the pilot signal 23 from the power receiver 3d installed on the secondary mirror 14, and obtains the transmitting direction information 15. The power transmitter 1d emits the electromagnetic wave 2d in the transmitting direction calculated based on the transmitting direction information 15, that is, to the power receiver 3d of the secondary mirror 14.

As explained above, each power transmitter 1 obtains the transmitting direction information 15 based on the pilot signal 23 received from the power receiver 3, and calculates the transmitting direction of the electromagnetic wave 2 based on the transmitting direction information 15. Next, the power transmitter 1 emits the electromagnetic wave 2 toward the specific power receiver 3 based on the calculated transmitting direction. Hence, the wireless power supply system has less emission failure, and can supply electric power efficiently. In particular, in the case in which control information from the driver controller is unavailable, or in the case in which a secondary reflector or the like is driven around the AZ axis, the EL axis and the secondary mirror drive axis and performs a complex motion with a large drive error, the wireless power supply system can supply electric power efficiently and stably.

Figure 8:
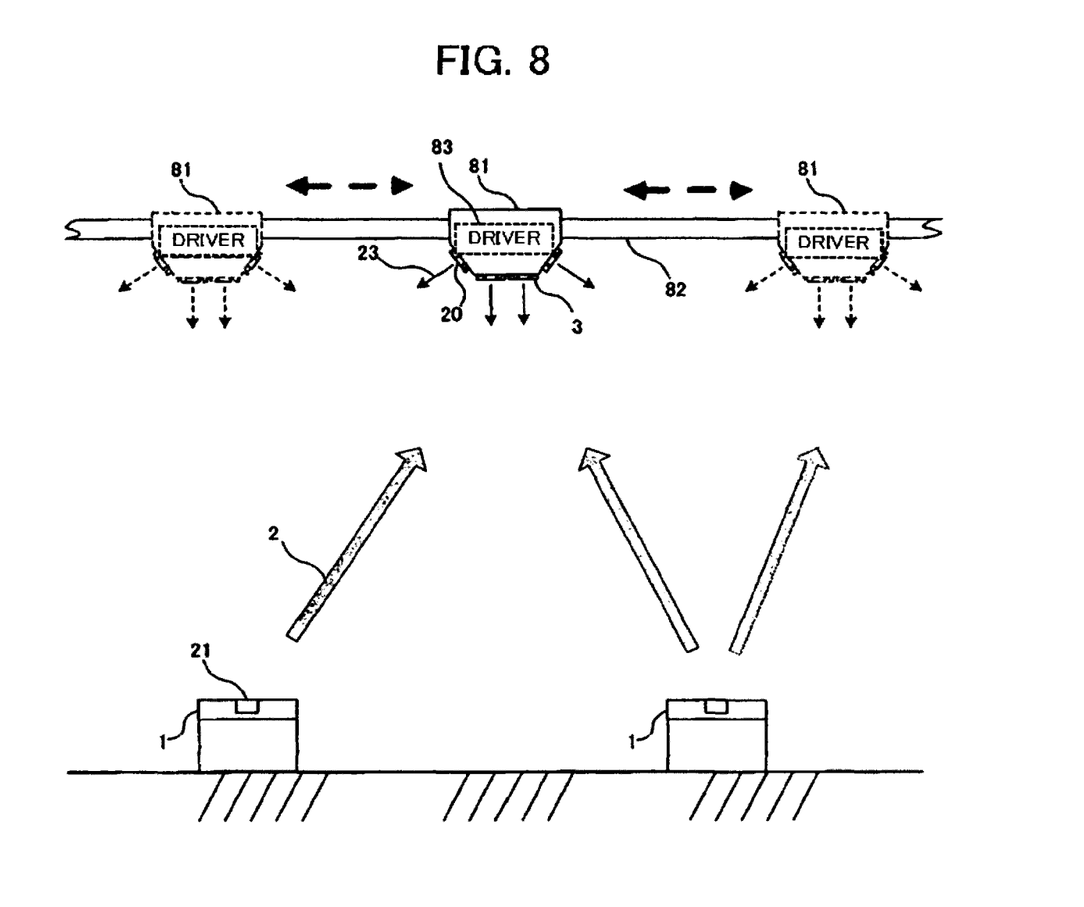
FIG. 8 is a structure explanatory diagram of a wireless power supply system according to another embodiment.
Figure 9:
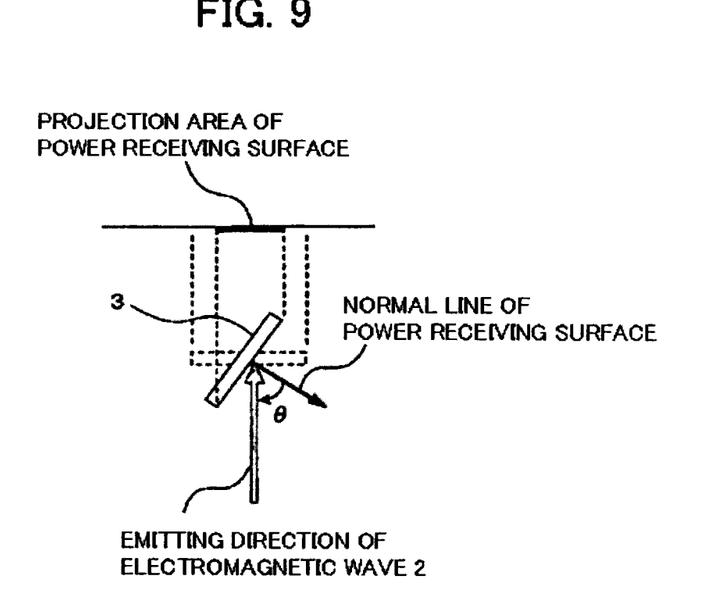
FIG. 9 is an explanatory diagram of an angle formed between an electromagnetic wave emitting direction and a power receiving surface.

The present disclosure has described the rotatable object, but the same advantageous effects is accomplished in the case of a linear motion. For example, FIG. 8 illustrates a case in which electric power is supplied to an overhead travelling crane provided on the ceiling of a large-scale warehouse or the like. In FIG. 8, reference numeral 81 denotes a carriage that is a movable object that includes the power receivers 3 supplying electric power to a driver or the like and reciprocates while hanging heavy loads or the like, reference numeral 82 denotes a running track that forms a linear track and guides the moving carriage 81, and reference numeral 83 denotes a driver that drives the carriage 81 in directions indicated by arrows in the figure using electric power supplied from the power receivers 3. The power transmitters 1 are disposed on the ground at plural locations. The power receivers 3 attached to the carriage 81 that is the movable object are disposed in such a way that at least one of the power receivers 3 is located within the coverage area formed by the electromagnetic wave 2 transmitted by the power transmitter 1 under a condition that an angle θ between the emitting direction of the electromagnetic wave 2 and the normal line of the power receiving surface of the power receiver 3 satisfies −θ'<θ<θ'. Here, FIG. 9 illustrates a relationship of the angle θ between the emitting direction of the electromagnetic wave 2 and the normal line of the power receiving surface. In FIG. 9, when θ'=60 degrees, the projection area of the power receiver 3 relative to the emitting direction of the electromagnetic wave 2 becomes ½. That is, the received electric power becomes half. Hence, θ desirably satisfies, for example, −60 degrees<θ<60 degrees depending on the necessary electric power and the magnitude of the electric power of the electromagnetic wave 2.

When the power transmitters 1 and the power receivers 3 are disposed as explained above, a power cable to supply electric power becomes unnecessary, and the same advantageous effect is accomplished as the above explained embodiments that electric power is supplied stably to the power receivers 3 even when the overhead travelling crane is in operation. Particularly, in FIG. 8, as with the fourth embodiment, each power transmitter 1 receives the pilot signal 23 transmitted by the pilot signal transmitter 20 of the power receiver 3, obtains the transmitting direction information 15 based on the received pilot signal, and emits the electromagnetic wave 2 in the calculated transmitting direction toward the specific power receiver 3. Therefore, the wireless power supply system can supply electric power efficiently.

The above explained embodiments all permit various modifications within the scope of the present invention. The above explained embodiments are to explain the present disclosure, and are not intended to limit the scope of the present invention. The scope of the present invention is defined by the appended claims rather than the embodiments. Various modifications carried out within the scope of the claims and the equivalent range thereto should be within the scope of the present invention.

This application claims priority based on Japanese Patent Application No. 2012-149334 filed on Jul. 3, 2012, and including the specification, the claims, the drawings, and the abstract. The entire disclosure of this counterpart Japanese Patent Application is herein incorporated by reference.

REFERENCE SIGNS LIST

1 Power transmitter
2 Electromagnetic wave
3 Power receiver
4 AZ rotational structure (rotatable object)
5 AZ driver (driver)
6 Power consumer
7 EL driver
8 AZ axis (rotation axis)
9 EL mount (rotatable object)
10 Mount stage
11 Transmitting direction information obtainer (transmitting direction information obtaining means)
12 EL rotational structure (rotatable object)
13 Secondary mirror support (rotatable object)
14 Secondary mirror (rotatable object)
15 Transmitting direction information
16 EL axis (rotation axis)
18 Transmitting direction instruction
20 Pilot signal transmitter
21 Pilot signal receiver
22 Direction controllable transmitter (direction controllable transmitting means)
23 Pilot signal
51 AZ driver controller
52 AZ driver control data
71 AZ/EL driver controller
72 EL driver control data
81 Carriage (movable object)
82 Running track (track)
83 Driver

The invention claimed is:

1. A wireless power supply system that wirelessly supplies electric power through electromagnetic waves, the wireless power supply system comprising:
   a power transmitter configured to transmit an electromagnetic wave;
   a plurality of power receivers disposed on a rotatable object supported rotatably around a rotation axis by a mount stage and configured to receive the electromagnetic wave, the plurality of power receivers being disposed such that at least one power receiver of the plurality of power receivers is located within a coverage area formed by the electromagnetic wave transmitted by the power transmitter; and
   a driver controller configured to calculate transmitting direction information for determining a transmitting direction of the electromagnetic wave for the at least one power receiver located within the coverage area, from driver control data to control a driver that drives rotation of the rotatable object,
   wherein the power transmitter is further configured to:
      obtain the transmitting direction information; and
      transmit the electromagnetic wave in a direction calculated based on the transmitting direction information.

2. The wireless power supply system according to claim 1, further comprising a battery that stores electric power converted from the electromagnetic wave received by the at least one power receiver.

3. The wireless power supply system according to claim 1, further comprising a DC-DC converter that converts a direct current voltage into another direct current voltage.

4. A power transmission device that wirelessly supplies electric power through electromagnetic waves, the power transmission device comprising:
   a power transmitter configured to:
      transmit an electromagnetic wave to a plurality of power receivers disposed on a rotatable object supported rotatably around a rotation axis by a mount stage,
      obtain transmitting direction information, being calculated from driver control data to control a driver that drives rotation of the rotatable object, for determining a transmitting direction of the electromagnetic wave toward at least one power receiver among the plurality of power receivers disposed such that the at least one power receiver is located within a coverage area formed by the electromagnetic wave; and
      transmit the electromagnetic wave in a direction calculated based on the transmitting direction information.

5. A power receiving device that wirelessly receives electric power through electromagnetic waves, the power receiving device comprising:
   a plurality of power receivers disposed on a rotatable object, the rotatable object supported rotatably around a rotation axis by a mount stage, driven around the rotation axis by a driver, and receiving an electromagnetic wave transmitted by a power transmitter,
   wherein the power transmitter controls a transmitting direction of the electromagnetic wave based on transmitting direction information being calculated from driver control data to control the driver, and
   the plurality of power receivers is disposed such that at least one power receiver of the plurality of power receivers is located within a coverage area formed by the electromagnetic wave.

6. A wireless power supply system comprising:
   a plurality of power receivers disposed on a rotatable object supported rotatably around a rotation axis by a mount stage and configured to receive an electromagnetic wave; and
   a power transmitter configured to transmit the electromagnetic wave by directing an emitting direction of a beam to at least one power receiver among the plurality of power receivers that rotate, based on driver control data to control a driver that drives rotation of the rotatable object.

* * * * *